United States Patent
Jeong

(10) Patent No.: US 9,869,893 B2
(45) Date of Patent: Jan. 16, 2018

(54) DISPLAY DEVICE AND METHOD OF FABRICATING THE SAME

(71) Applicant: LG DISPLAY CO., LTD., Seoul (KR)

(72) Inventor: Hae-hyeon Jeong, Gyeongsangbuk-do (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 14/935,142

(22) Filed: Nov. 6, 2015

(65) Prior Publication Data

US 2016/0062174 A1 Mar. 3, 2016

Related U.S. Application Data

(63) Continuation of application No. 13/559,273, filed on Jul. 26, 2012, now Pat. No. 9,341,874.

(30) Foreign Application Priority Data

Jul. 27, 2011 (KR) .................. 10-2011-0074422
Nov. 3, 2011 (KR) .................. 10-2011-0113845

(51) Int. Cl.
*G02F 1/1333* (2006.01)
*G02F 1/1335* (2006.01)

(52) U.S. Cl.
CPC .. *G02F 1/133308* (2013.01); *G02F 1/133512* (2013.01); *G02F 1/133528* (2013.01); *G02F 1/133602* (2013.01); *G02F 2001/13332* (2013.01); *G02F 2001/133314* (2013.01); *G02F 2001/133317* (2013.01); *G02F 2001/133325* (2013.01); *G02F 2202/28* (2013.01); *Y10T 156/10* (2015.01)

(58) Field of Classification Search
CPC ......... G02F 1/133308; G02F 1/133512; G02F 1/133528; G02F 1/133602; G02F 2001/133314; G02F 2001/133317; G02F 2001/13332; G02F 2001/133325
USPC .................. 349/58, 61–65; 362/600–632
See application file for complete search history.

(56) References Cited

U.S. PATENT DOCUMENTS

| | | | |
|---|---|---|---|
| 5,835,179 A | 11/1998 | Yamanaka | |
| 7,841,761 B2* | 11/2010 | Chen | B29C 45/14467 349/58 |
| 8,797,473 B2* | 8/2014 | Takabayashi | G02F 1/13452 349/58 |

(Continued)

FOREIGN PATENT DOCUMENTS

| | | |
|---|---|---|
| DE | 10 2004 057 908 A1 | 6/2006 |
| EP | 1 791 016 A2 | 5/2007 |

(Continued)

OTHER PUBLICATIONS

Bahadur, "Liquid Crystals Applications and Uses," vol. 1, World Scientific, 1990, pp. 171-194.

*Primary Examiner* — Edward Glick
*Assistant Examiner* — David Chung
(74) *Attorney, Agent, or Firm* — Birch, Stewart, Kolasch & Birch, LLP

(57) ABSTRACT

A display device can include a display panel displaying an image, a first frame surrounding the display panel, a backlight unit under the display panel, and an adhesive between a side surface of the display panel and a side surface of the first frame. Also, the display panel is attached and fixed to the first frame by the adhesive.

14 Claims, 5 Drawing Sheets

(56) References Cited

U.S. PATENT DOCUMENTS

| | | |
|---|---|---|
| 2004/0252253 A1 | 12/2004 | Miyashita et al. |
| 2007/0002206 A1* | 1/2007 | Shirai ............... G02F 1/133308 349/58 |
| 2008/0018823 A1 | 1/2008 | Wang |
| 2008/0297680 A1* | 12/2008 | Hwang ............. G02F 1/133308 349/58 |
| 2009/0004408 A1* | 1/2009 | Nakanishi ......... G02F 1/133308 428/12 |
| 2009/0011197 A1 | 1/2009 | Matsuhira |
| 2009/0185100 A1 | 7/2009 | Matsuhira et al. |
| 2010/0123850 A1 | 5/2010 | Miyashita |
| 2011/0236643 A1 | 9/2011 | Tsubouchi et al. |
| 2011/0261283 A1* | 10/2011 | Kim ...................... G03B 17/02 349/58 |
| 2012/0182492 A1 | 7/2012 | Ro et al. |

FOREIGN PATENT DOCUMENTS

| | | |
|---|---|---|
| EP | 1 791 017 A1 | 5/2007 |
| JP | 10-123964 A | 5/1998 |
| JP | 11-64844 A | 3/1999 |
| JP | 2010-128155 A | 6/2010 |
| WO | WO 2007/091130 A1 | 8/2007 |
| WO | WO 2010/061761 A1 | 6/2010 |

* cited by examiner

DISPLAY DEVICE AND METHOD OF FABRICATING THE SAME

CROSS REFERENCE TO RELATED APPLICATIONS

This application is a Continuation of co-pending U.S. application Ser. No. 13/559,273 filed on Jul. 26, 2012, which claims the priority benefit of Korean Patent Application No. 10-2011-0074422 filed in Republic of Korea on Jul. 27, 2011 and Korean Patent Application No. 10-2011-0113845 filed in Republic of Korea on Nov. 3, 2011, which are hereby incorporated by reference in their entirety.

BACKGROUND OF THE INVENTION

Field of the Disclosure

The present disclosure relates to a display device, and more particularly, to a display device including an adhesive that combines a display panel and a frame and preventing a light leakage and a method of fabricating the display device.

Discussion of the Related Art

Recently, as information age progresses, demand for display device has increased in various forms. In addition, various flat panel displays (FPDs) having a thin profile, a light weight and a low power consumption such as a liquid crystal display (LCD), a plasma display panel (PDP) and an organic light emitting diode (OLED) have been researched.

Among various FPDs, a liquid crystal display (LCD) device is one of the most widely utilized FPDs. Since the LCD device has advantages such as high contrast ratio and superiority in displaying a moving image, the LCD device has been used for a monitor of a computer or a television as well as a display unit of a mobile terminal by substituting for a cathode ray tube (CRT). The LCD device displays an image by using optical anisotropy and polarization properties of liquid crystal molecules.

The LCD device includes two substrates having a pixel electrode and a common electrode, respectively, and a liquid crystal layer between the two substrates. In the LCD device, an alignment direction of liquid crystal molecules of the liquid crystal layer is determined according to an electric field generated by voltages applied to the pixel electrode and the common electrode and an image is displayed by controlling polarization of incident light according to the alignment direction.

Since the LCD device is a non-emissive type display device, an additional light source is required. Accordingly, a backlight unit including a light source is disposed under the liquid crystal panel. For example, one of a cold cathode fluorescent lamp (CCFL), an external electrode fluorescent lamp (EEFL) and a light emitting diode (LED) may be used as the light source.

The liquid crystal panel and the backlight unit are modularized with main, top and bottom frames. The main frame having a rectangular ring shape surrounds side surfaces of the liquid crystal panel and the backlight unit. In addition, the top frame covers an edge portion of a front surface of the liquid crystal panel and the bottom frame covers a rear surface of the liquid crystal panel.

An application field of the LCD device has expanded, and the LCD device having a wide display area even with a reduced weight and a reduced volume has been widely researched. Accordingly, the LCD device having a light weight and a thin profile by omitting the top frame has been suggested.

In addition, the LCD device having a wide display area by reducing a bezel area as a non-display area has been suggested. The reduced bezel area of the LCD device may be referred to as a narrow bezel.

In the LCD device including the main frame and the bottom frame without the top frame, the liquid crystal panel may be attached and fixed to the main frame or the bottom frame using a tape such as a double-sided tape. The tape may function as a light shielding member that prevents a light leakage through the non-display area.

However, since the tape has a working limit of about 1.0 mm, the LCD device using the tape for the liquid crystal panel can not have a narrow bezel of a width smaller than about 1.0 mm. For example, the tape can not be designed to have a width smaller than about 1.0 mm due to the working limit. In addition, since the liquid crystal panel is fixed by the tape, the tape may have a width greater than about 1.5 mm for a sufficient fixing force. Since the tape has a width greater than about 1.5 mm, the liquid crystal panel may be designed to have a black matrix area as a non-display area of a width of about 1.5 mm to about 1.8 mm, and the LCD device may be designed to have a bezel area as a non-display area of a width of about 2.0 mm to about 2.3 mm. As a result, it is difficult to obtain the LCD device having a narrow bezel.

The main frame surrounding the backlight unit and the liquid crystal panel may be formed of a white colored material to improve brightness of the LCD device by reflecting a part of light from the backlight unit. However, another part of light from the backlight unit may penetrate the main frame of a white colored material to generate a light leakage through a side surface of the LCD device.

In addition, the main frame may be formed through a double injection molding method to support side surfaces of the liquid crystal panel and the backlight unit. When the specification of the LCD device is changed, a new mold is required for the main frame. As a result, fabrication cost of the LCD device increases.

SUMMARY OF THE INVENTION

Accordingly, the present invention is directed to a display device that substantially obviates one or more of the problems due to limitations and disadvantages of the related art.

An object of the present disclosure is to provide a display device having a light weight, a thin profile and a narrow bezel and a method of fabricating the display device.

Another object of the present disclosure is to provide a display device where a display panel is stably fixed to a frame due to an adhesive and a method of fabricating the display device.

Another object of the present invention is to provide a display device where a light leakage through a side surface is prevented due to an adhesive and a method of fabricating the display device.

Another object of the present invention is to provide a display device where a fabrication cost is reduced due to an adhesive and a method of fabricating the display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a display device includes: a display panel displaying an image; a first frame surrounding the display panel; and an adhesive between a side surface of the display panel and a side surface of the first frame, wherein the display device is attached and fixed to the first frame by the adhesive.

In another aspect, a method of fabricating a display device includes: providing a display panel displaying an image; forming a first frame surrounding the display panel; and forming an adhesive between a side surface of the display panel and a side surface of the first frame by a coating method, wherein the display panel is attached and fixed to the first frame by the adhesive.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
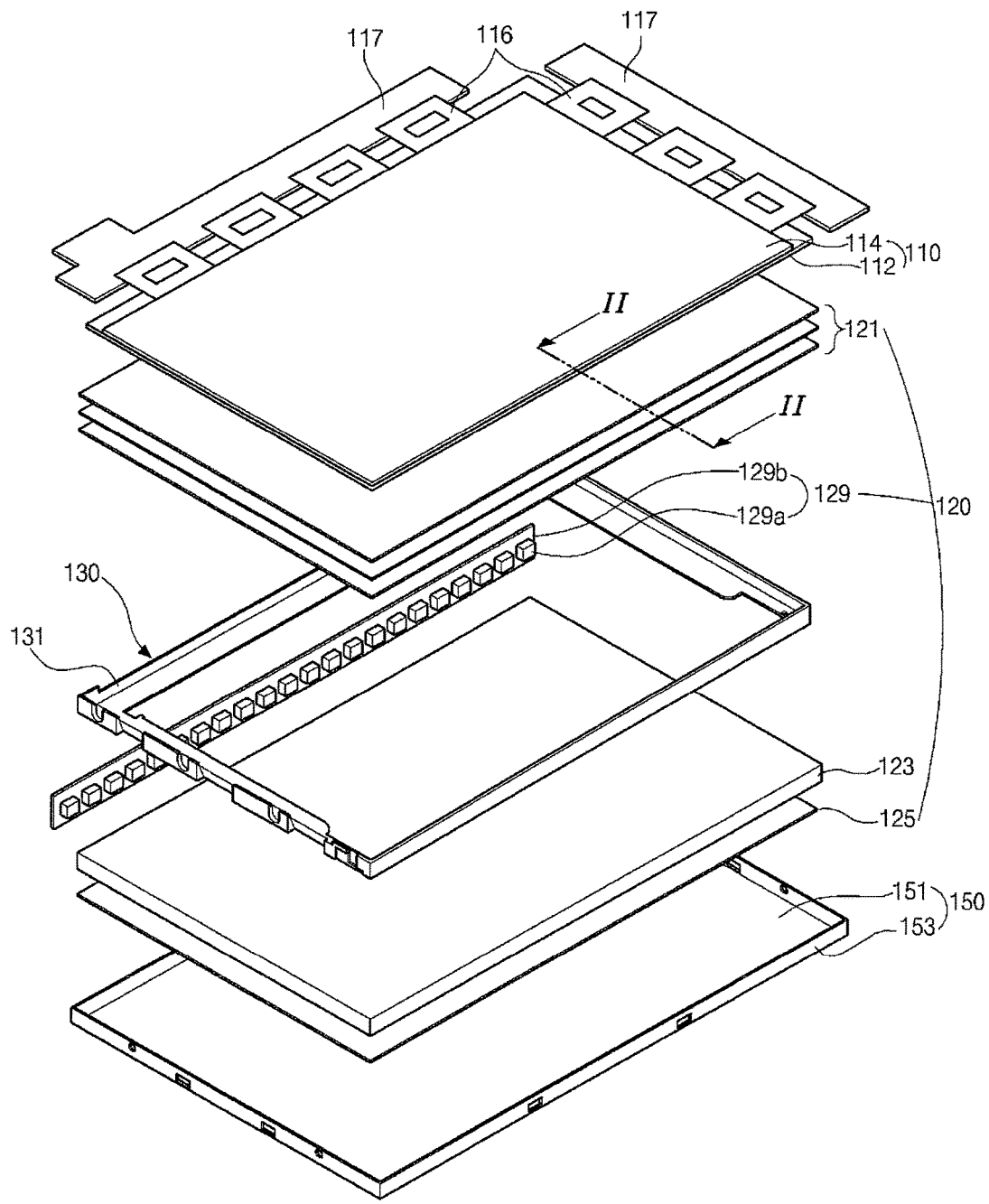
FIG. 1 is an exploded perspective view showing a liquid crystal display device according to a first embodiment of the present invention.

FIG. 1 is an exploded perspective view showing a liquid crystal display device according to a first embodiment of the present invention.

In FIG. 1, a liquid crystal display (LCD) device 100 includes a liquid crystal panel 110, a backlight unit 120, a main frame 130 and a bottom frame 150. The main frame 130 may be referred to as a guide panel, a main support or a mold frame and the bottom frame 150 may be referred to as a bottom cover or a lower cover. The liquid crystal panel 110 displaying an image includes first and second substrates 112 and 114 facing and spaced apart from each other and a liquid crystal layer (not shown) interposed therebetween.

Although not shown, when the liquid crystal panel 110 has an active matrix type, a gate line, a data line, a thin film transistor (TFT) and a pixel electrode may be formed on an inner surface of the first substrate 112 referred to as a lower substrate or an array substrate. In addition, a color filter layer, a black matrix and a common electrode may be formed on an inner surface of the second substrate 114 referred to as an upper substrate or a color filter substrate. The gate line and the data line cross each other to define a pixel region and the TFT is connected to the gate line and the data line. Further, the pixel electrode is connected to the TFT. The color filter layer includes red, green and blue color filters each corresponding to the pixel region and the black matrix covers the gate line, the data line and the TFT. Moreover, the common electrode is formed on the color filter layer and the black matrix. The liquid crystal panel 110 further includes first and second polarizing plates where a predetermined polarized light selectively passes on outer surfaces of the first and second substrates 112 and 114, respectively.

A printed circuit board (PCB) 117 is connected to at least one side of the liquid crystal panel 110 through a connecting means 116 such as a flexible circuit board (FPC) or a tape carrier package (TCP). The PCB 117 may be bent toward a side surface or a rear surface of the main frame 130 during modularization.

When the TFT connected to the gate line is turned on by a gate signal of a gate driving circuit, a data signal of a data driving circuit is applied to the pixel electrode through the data line and an alignment direction of liquid crystal molecules of the liquid crystal layer is changed by an electric field generated between the pixel electrode and the common electrode. As a result, the liquid crystal panel 110 produces transmittance difference and displays images.

The backlight unit 120 is disposed under the liquid crystal panel 110. The backlight unit 120 includes a light emitting diode (LED) assembly 129, a reflecting plate 125, a light guide plate 123 and a plurality of optical sheets 121. The LED assembly 129 is disposed along at least one side of the main frame 130 and the reflecting plate 125 having a white color or a silver color is disposed over the bottom frame 150. In addition, the light guide plate 123 is disposed over the reflecting plate 125 and the plurality of optical sheets 121 are disposed over the light guide plate 123.

The LED assembly 129 includes a plurality of LEDs 129a and an LED PCB 129b where the plurality of LEDs 129a are formed to be spaced apart from each other. Each of the plurality of LEDs 129a may include an LED chip emitting red-colored, green-colored and blue-colored lights or a white-colored light and may emit a white-colored light to an incident surface of the light guide plate 123. Alternatively, the plurality of LEDs 129a may include a plurality of red LEDs, a plurality of green LEDs and a plurality of blue LEDs and may emit a mixed white-colored light by turning on the red, green and blue LEDs at the same time.

Instead of the LED assembly 129, a cold cathode fluorescent lamp (CCFL), an external electrode fluorescent lamp (EEFL) may be used as a light source of the backlight unit.

The light emitted from the plurality of LEDs 129a enters the light guide plate 123 and is uniformly diffused in the whole light guide plate 123 by total reflection so that a planar light can be supplied to the liquid crystal panel 110. For the purpose of supplying a uniform planar light, the light guide plate 123 may include a uniformity pattern on the bottom surface thereof. For example, one of an elliptical pattern, a polygonal pattern and a hologram pattern may be formed on the bottom surface of the light guide plate 123 as the uniformity pattern to guide the light entering the light guide plate 123 and the uniformity pattern may be formed by a printing method or an injecting method.

The reflecting plate 125 is disposed under the light guide plate 123 and reflects the light passing through a bottom surface of the light guide plate 123 toward the liquid crystal panel 110 to improve brightness and efficiency of the light.

The plurality of optical sheets 121 over the light guide plate 123 may include a diffusing sheet and at least one collimating sheet. The plurality of optical sheets 121 may diffuse or collimate the light passing through the light guide plate 123 to improve uniformity of the planar light.

As a result, the light from the plurality of LEDs 129a becomes the planar light through the light guide plate 123 and the planar light enters the liquid crystal panel 110 through the plurality of optical sheets 121. Further, the liquid crystal panel 110 displays an image of high brightness using the planar light.

The liquid crystal panel 110 and the backlight unit 120 may be modularized by the main frame 130 and the bottom frame 150. The bottom frame 150 includes a horizontal portion 151 contacting the rear surface of the backlight unit 120 and a sidewall portion 153 perpendicularly bent from an edge portion of the horizontal portion 151. The liquid crystal panel 110 and the backlight unit 120 are disposed over the bottom frame 150 and the bottom frame 150 functions as a base of modularization of the LCD device 100.

The main frame 130 includes a vertical portion 131 surrounding side surfaces of the liquid crystal panel 110 and the backlight unit 120. The main frame 130 may have a rectangular ring shape and may be combined with the bottom frame 150.

Since a top frame is omitted in the LCD device 100, the LCD device 100 has a light weight and a thin profile. In addition, a method of fabricating the LCD device is simplified and fabrication cost is reduced.

An adhesive 180 (of FIG. 2) is formed among the main frame 130, the bottom frame 150 and the liquid crystal panel 110. The liquid crystal panel 110 is fixed to the main frame 130 and the bottom frame 150 by the adhesive 180.

Figure 2:
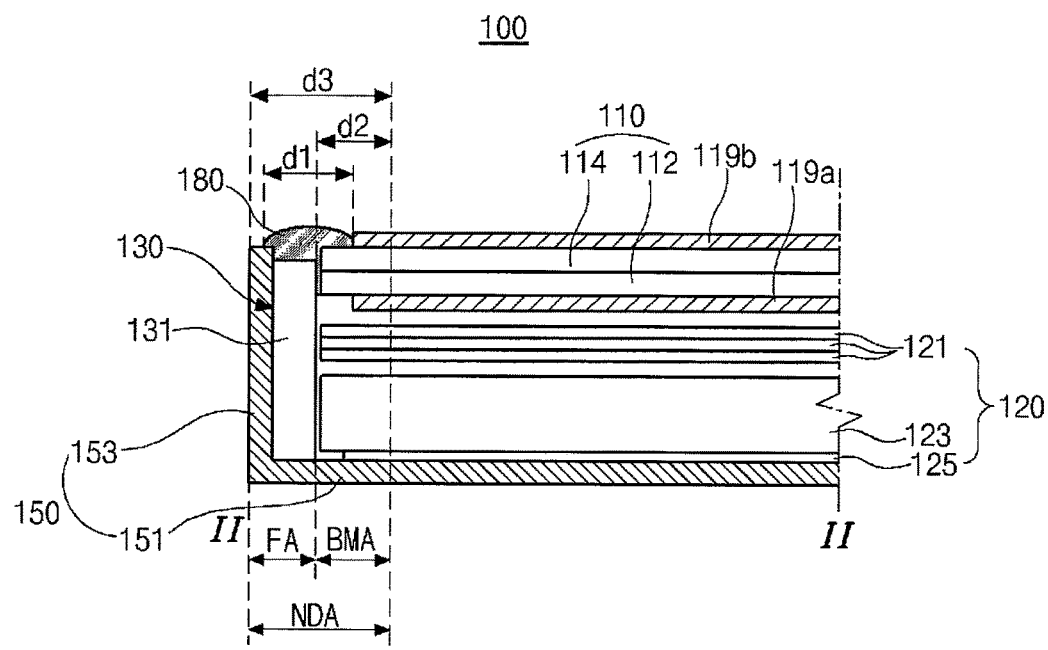
FIG. 2 is a cross-sectional view, which is taken along a line II-II of FIG. 1, showing a liquid crystal display device according to a first embodiment of the present invention.

FIG. 2 is a cross-sectional view, which is taken along a line II-II of FIG. 1, showing a liquid crystal display device according to a first embodiment of the present invention.

In FIG. 2, the LCD device 100 includes the liquid crystal panel 110, the backlight unit 120, the main frame 130 and the bottom frame 150. The reflecting plate 125, the light guide plate 123, the LED assembly 129a (of FIG. 1) and the plurality of optical sheets 121 constitute the backlight unit 120. In addition, the liquid crystal panel 110 including the first and second substrates 112 and 114 and the liquid crystal layer (not shown) therebetween is disposed over the backlight unit 120. The first and second polarizing plates 119a and 119b are formed on the outer surfaces of the first and second substrates 112 and 114, respectively.

The backlight unit 120 and the liquid crystal panel 110 are surrounded by the vertical portion of the main frame 130, and the bottom frame 150 including the horizontal portion 151 and the sidewall portion 153 is coupled to the main frame 130.

An edge portion of the liquid crystal panel 110 is attached and fixed to the main frame 130 and the bottom frame 150 by the adhesive 180. For example, the adhesive 180 may be formed on a side surface of the edge portion of the liquid crystal panel 110, a side surface of the vertical portion 131 of the main frame 130 and a side surface of the sidewall portion 153 of the bottom frame 150. For the purpose of improving a fixing force for the liquid crystal panel 110, the adhesive 180 may be further formed on a front surface of the edge portion of the liquid crystal panel 110, a top surface of the vertical portion 131 of the main frame 130 and a top surface of the sidewall portion 153 of the bottom frame 150.

The adhesive 180 may have a liquid phase or a gel phase having a viscosity so that the adhesive 180 can be formed through a coating method. For example, the adhesive 180 may include one of polyester material such as cyanoacrylate resin, epoxy resin, polyolefine, polymethylmethacrylate (PMMA), polyacrylate, polyacrylic acid, polyurethane and polyethyleneterephthalate (PET), instant glue such as silicon resin, polymer glue resin such as thermal glue and solvent-based glue, derivatives thereof and blends including at least two thereof.

The adhesive 180 may be hardened by one of a heat, a light, a moisture and a time through a subsequent curing step. For example, after the adhesive 180 having a liquid phase or a gel phase is formed among the liquid crystal panel 110, the main frame 130 and the bottom frame 150 through a coating method, the adhesive 180 may be hardened by irradiation of an ultraviolet (UV) light. For the curing step of irradiating a UV light, the adhesive 180 may include a monomer, a photoinitiator, a photocatalyst and a solvent.

Accordingly, after the liquid crystal panel 110 and the backlight unit 120 are surrounded by the main frame 130 and the bottom frame 150, the adhesive 180 of a liquid phase or a gel phase may be formed among the liquid crystal panel 110, the main frame 130 and the bottom frame 150 by a coating method. Next, the liquid crystal panel 110 is attached and fixed to the main frame 130 and the bottom frame 150 by hardening the adhesive 180 through a curing step.

Since the adhesive 180 is formed on the front surface and the side surface of the edge portion of the liquid crystal panel 110, the top surface of the vertical portion 131 of the main frame 130 and the top surface of the sidewall portion 153 of the bottom frame 150 by a coating method, the adhesive 180 having a relatively small width may stably attach and fix the liquid crystal panel 110 to the main frame 130 and the bottom frame 150. For example, the adhesive 180 may have a first width d1 smaller than about 0.5 mm.

A non-display area NDA (bezel area) of the LCD device 100 includes a black matrix area BMA of the liquid crystal panel 110 and a frame area FA for the main frame 130 and the bottom frame 150. Since the adhesive 180 is formed in the non-display area NDA, the LCD device 100 may have a narrow bezel. For example, the black matrix area BMA may have a second width d2 smaller than about 0.8 mm and the non-display area NDA of the LCD device 100 may have a third width smaller than about 1.0 mm by forming the adhesive 180 having the first width smaller than about 0.5 mm.

In the LCD device 100 where a top frame is omitted, since the adhesive 180 in the non-display area NDA attaches and fixes the liquid crystal panel 110 to the main frame 130 and the bottom frame 150, an additional area for a fixing member such as a tape is not required. Accordingly, a narrow bezel where the width of the bezel area is smaller than about 1.0 mm is obtained. In addition, since the adhesive 180 is formed on the front surface and the side surface of the edge portion of the liquid crystal panel 110, a fixing force is improved so that the liquid crystal panel 110 can be stably attached and fixed to the main frame 130 and the bottom frame 150.

Figure 3:
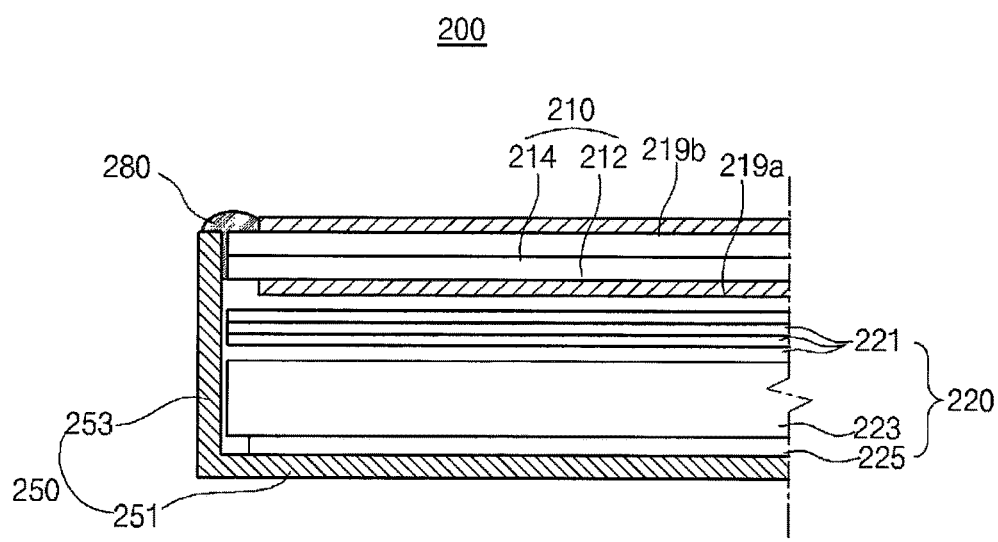
FIG. 3 is a cross-sectional view showing a liquid crystal display according to a second embodiment of the present invention.

FIG. 3 is a cross-sectional view showing a liquid crystal display according to a second embodiment of the present invention.

In FIG. 3, a liquid crystal display (LCD) device 200 includes a liquid crystal panel 210, a backlight unit 220 and a bottom frame 250. A reflecting plate 225, a light guide plate 223, a light emitting diode (LED) assembly (not shown) and a plurality of optical sheets 221 constitute the backlight unit 220. In addition, the liquid crystal panel 210 including first and second substrates 212 and 214 and a liquid crystal layer (not shown) therebetween is disposed over the backlight unit 220. First and second polarizing plates 219a and 219b are formed on the outer surfaces of the first and second substrates 212 and 214, respectively.

The backlight unit 220 and the liquid crystal panel 210 are surrounded by the bottom frame 250 including a horizontal portion 251 and a sidewall portion 253. An edge portion of the liquid crystal panel 210 is attached and fixed to the bottom frame 150 by an adhesive 280. For example, the adhesive 280 may be formed on a side surface of the edge portion of the liquid crystal panel 210 and a side surface of the sidewall portion 253 of the bottom frame 250. For the purpose of improving a fixing force for the liquid crystal panel 210, the adhesive 280 may be further formed on a front surface of the edge portion of the liquid crystal panel 210 and a top surface of the sidewall portion 253 of the bottom frame 250.

The adhesive 280 may have a liquid phase or a gel phase having a viscosity so that the adhesive 280 can be formed through a coating method. For example, the adhesive 280 may include one of polyester material such as cyanoacrylate resin, epoxy resin, polyolefine, polymethylmethacrylate (PMMA), polyacrylate, polyacrylic acid, polyurethane and polyethyleneterephthalate (PET), instant glue such as silicon resin, polymer glue resin such as thermal glue and solvent-based glue, derivatives thereof and blends including at least two thereof.

The adhesive 280 may be hardened by one of a heat, a light, a moisture and a time through a subsequent curing step. For example, after the adhesive 280 having a liquid phase or a gel phase is formed between the liquid crystal panel 210 and the bottom frame 250 through a coating method, the adhesive 280 may be hardened by irradiation of an ultraviolet (UV) light. For the curing step of irradiating a UV light, the adhesive 280 may include a monomer, a photoinitiator, a photocatalyst and a solvent.

Accordingly, after the liquid crystal panel 210 and the backlight unit 220 are surrounded by the bottom frame 250, the adhesive 280 of a liquid phase or a gel phase may be formed between the liquid crystal panel 210 and the bottom frame 250 by a coating method. Next, the liquid crystal panel 210 is attached and fixed to the bottom frame 250 by hardening the adhesive 280 through a curing step.

Since the adhesive 280 is formed on the front surface and the side surface of the edge portion of the liquid crystal panel 210 and the top surface of the sidewall portion 253 of the bottom frame 250 by a coating method, the adhesive 280 having a relatively small width may stably attach and fix the liquid crystal panel 210 to the bottom frame 250. In addition, since the adhesive 280 is formed in the non-display area NDA, the LCD device 200 may have a narrow bezel.

In the LCD device 200 where a top frame and a main frame are omitted, since the adhesive 280 in the non-display area NDA attaches and fixes the liquid crystal panel 210 to the bottom frame 250, an additional area for a fixing member such as a tape is not required. Accordingly, a narrow bezel where the width of the bezel area is smaller than about 1.0 mm is obtained. In addition, since the adhesive 280 is formed on the front surface and the side surface of the edge portion of the liquid crystal panel 210, a fixing force is improved so that the liquid crystal panel 210 can be stably attached and fixed to the bottom frame 250.

Figure 4:
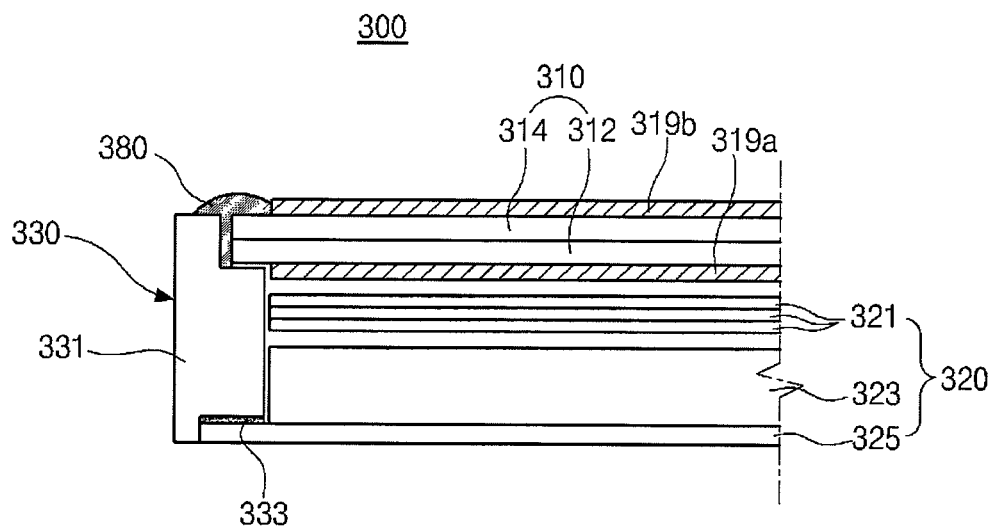
FIG. 4 is a cross-sectional view showing a liquid crystal display according to a third embodiment of the present invention.

FIG. 4 is a cross-sectional view showing a liquid crystal display according to a third embodiment of the present invention.

In FIG. 4, a liquid crystal display (LCD) device 300 includes a liquid crystal panel 310, a backlight unit 320 and a main frame 330. A reflecting plate 325, a light guide plate 323, a light emitting diode (LED) assembly (not shown) and a plurality of optical sheets 321 constitute the backlight unit 320. In addition, the liquid crystal panel 310 including first and second substrates 312 and 314 and a liquid crystal layer (not shown) therebetween is disposed over the backlight unit 320. First and second polarizing plates 319a and 319b are formed on the outer surfaces of the first and second substrates 312 and 314, respectively.

The backlight unit 320 and the liquid crystal panel 310 are surrounded by the main frame 330 having a rectangular ring shape and including a vertical portion 331. The reflecting plate 325 is attached to the main frame 330 by an attaching member 333 such as a double-sided tape. An edge portion of the liquid crystal panel 310 is attached and fixed to the main frame 330 by an adhesive 380. For example, the adhesive 380 may be formed on a side surface of the edge portion of the liquid crystal panel 310 and a side surface of the vertical portion 331 of the main frame 330. For the purpose of improving a fixing force for the liquid crystal panel 310, the adhesive 380 may be further formed on a front surface of the edge portion of the liquid crystal panel 310 and a top surface of the vertical portion 331 of the main frame 330.

The adhesive 380 may have a liquid phase or a gel phase having a viscosity so that the adhesive 380 can be formed through a coating method. For example, the adhesive 380 may include one of polyester material such as cyanoacrylate resin, epoxy resin, polyolefine, polymethylmethacrylate (PMMA), polyacrylate, polyacrylic acid, polyurethane and polyethyleneterephthalate (PET), instant glue such as silicon resin, polymer glue resin such as thermal glue and solvent-based glue, derivatives thereof and blends including at least two thereof.

The adhesive 380 may be hardened by one of a heat, a light, a moisture and a time through a subsequent curing step. For example, after the adhesive 380 having a liquid phase or a gel phase is formed between the liquid crystal panel 310 and the main frame 330 through a coating method, the adhesive 380 may be hardened by irradiation of an ultraviolet (UV) light. For the curing step of irradiating a UV light, the adhesive 380 may include a monomer, a photoinitiator, a photocatalyst and a solvent.

Accordingly, after the liquid crystal panel 310 and the backlight unit 320 are surrounded by the main frame 330, the adhesive 380 of a liquid phase or a gel phase may be formed between the liquid crystal panel 310 and the main frame 330 by a coating method. Next, the liquid crystal panel 310 is attached and fixed to the main frame 330 by hardening the adhesive 380 through a curing step.

Since the adhesive 380 is formed on the front surface and the side surface of the edge portion of the liquid crystal panel 310 and the top surface of the vertical portion 331 of the main frame 330 by a coating method, the adhesive 380 having a relatively small width may stably attach and fix the liquid crystal panel 310 to the main frame 330. In addition, since the adhesive 380 is formed in the non-display area NDA, the LCD device 300 may have a narrow bezel.

In the LCD device 300 where a top frame and a bottom frame are omitted, since the adhesive 380 in the non-display area NDA attaches and fixes the liquid crystal panel 310 to the main frame 330, an additional area for a fixing member such as a tape is not required. Accordingly, a narrow bezel where the width of the bezel area is smaller than about 1.0 mm is obtained. In addition, since the adhesive 380 is formed on the front surface and the side surface of the edge portion of the liquid crystal panel 310, a fixing force is improved so that the liquid crystal panel 310 can be stably attached and fixed to the main frame 330.

In another embodiment, a black colored adhesive may be used for preventing a light leakage through a side surface of the LCD device as well as for attaching and fixing the liquid crystal panel to the frame.

Figure 5A:
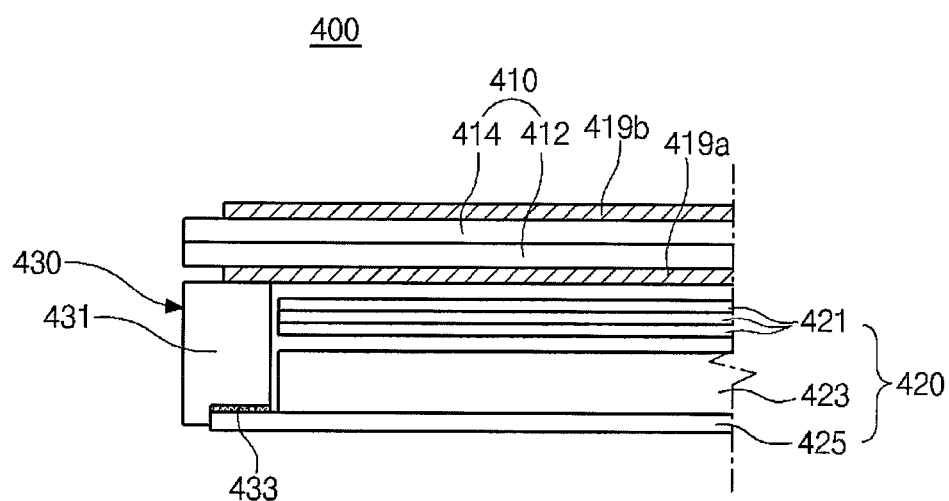
FIGS. 5A to 5C are cross-sectional views showing a method of fabricating a liquid crystal display device according to a fourth embodiment of the present invention.
Figure 5B:
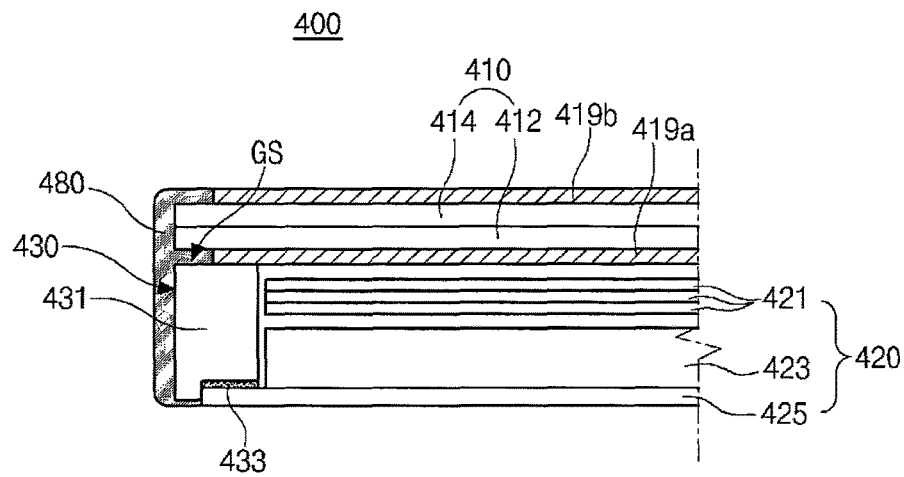
Figure 5C:
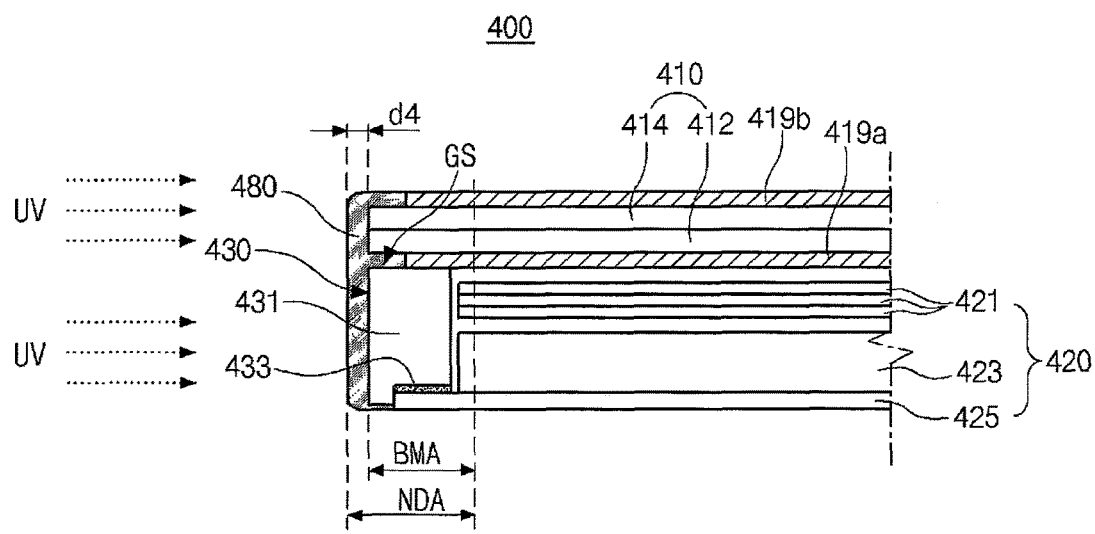

FIGS. 5A to 5C are cross-sectional views showing a method of fabricating a liquid crystal display device according to a fourth embodiment of the present invention.

In FIG. 5A, a liquid crystal display (LCD) device 400 includes a liquid crystal panel 410, a backlight unit 420 and a main frame 430. A light guide plate 423, a light emitting diode (LED) assembly (not shown) and a plurality of optical sheets 421 are sequentially disposed over a reflecting plate 425 to constitute the backlight unit 420. Next, a main frame 430 including a vertical portion 431 is formed to surround the backlight unit 420. For example, the reflecting plate 425 of the backlight unit 420 may be attached to the main frame 430 by an attaching member 433 such as a double-sided tape.

In addition, the main frame 430 may be formed of a mixture of a synthetic resin material such as polycarbonate and a glass fiber to have a white color. Since the main frame 430 is formed of a white colored material, brightness of the LCD device 400 is improved by reflecting a light from the backlight unit 420.

Next, the liquid crystal panel 410 including first and second substrates 412 and 414 and a liquid crystal layer (not shown) therebetween is disposed over the backlight unit 420. First and second polarizing plates 419a and 419b are formed on the outer surfaces of the first and second substrates 412 and 414, respectively. The backlight unit 420 supplies a planar light to the liquid crystal panel 410. Although not shown, a light shielding member such as a tape may be formed between the liquid crystal panel 410 and the main frame 430 to prevent a light leakage through a non-display area.

In FIG. 5B, an adhesive 480 having a black color is formed on a side surface of the LCD device 400 through a coating method. For example, the adhesive 480 may be formed on a front surface and a side surface of the edge portion of the liquid crystal panel 410. In addition, the adhesive 480 may be formed on a top surface and a side surface of the vertical portion 431 of the main frame 430. Accordingly, a gap space GS between the liquid crystal panel 410 and the main frame 430 may be filled with the adhesive 480.

The adhesive 480 may have a liquid phase or a gel phase having a viscosity so that the adhesive 480 can be formed through a coating method. For example, the adhesive 480 may include one of polyester material such as cyanoacrylate resin, epoxy resin, polyolefine, polymethylmethacrylate (PMMA), polyacrylate, polyacrylic acid, polyurethane and polyethyleneterephthalate (PET), instant glue such as silicon resin, polymer glue resin such as thermal glue and solvent-based glue, derivatives thereof and blends including at least two thereof. In addition, the adhesive 480 may further include a black dye material or a black pigment material.

In FIG. 5C, the adhesive 480 is hardened by irradiation of an ultraviolet (UV) light. For the curing step of irradiating a UV light, the adhesive 480 may include a monomer, a photoinitiator, a photocatalyst and a solvent. In another embodiment, the adhesive 480 may be hardened by one of a heat, a moisture and a time through a subsequent curing step. After the curing step, the edge portion of the liquid crystal panel 410 is attached and fixed to the main frame 430 by an adhesive 480.

In the LCD device 400 where a top frame and a bottom frame are omitted, since the adhesive 480 is formed to have a thickness smaller than about 0.3 mm, the adhesive 480 on the side surface of the LCD device 400 may have a fourth width d4 smaller than about 0.3 mm. In addition, since the adhesive 480 in a non-display area NDA attaches and fixes the liquid crystal panel 410 to the main frame 430, an additional area for a fixing member such as a tape is not required. Accordingly, a narrow bezel where the width of the bezel area is smaller than about 1.0 mm is obtained.

Furthermore, since the adhesive 480 having a black color is formed on the side surface of the LCD device 400, a part of light is reflected by the main frame 430 and another part of light penetrating the main frame 430 is absorbed by the adhesive 480. Accordingly, a light leakage through a side surface of the LCD device 400 is prevented without reduction of brightness.

Moreover, since the adhesive 480 is formed on the front surface and the side surface of the edge portion in a black matrix area BMA of the liquid crystal panel 410 and on the top surface and the side surface of the backlight unit 420, a fixing force is improved so that the liquid crystal panel 410 can be stably attached and fixed to the main frame 430.

In addition, since the liquid crystal panel 410 is attached and fixed to the backlight unit 420 by the adhesive 480 through a coating method, a new mold is not required for the main frame 430 even when the specification of the LCD device 400 is changed. Accordingly, fabrication cost is reduced. Further, since the adhesive 480 is formed of a resin material, the external impact to the LCD device 400 may be mitigated by the adhesive 480.

Figure 6:
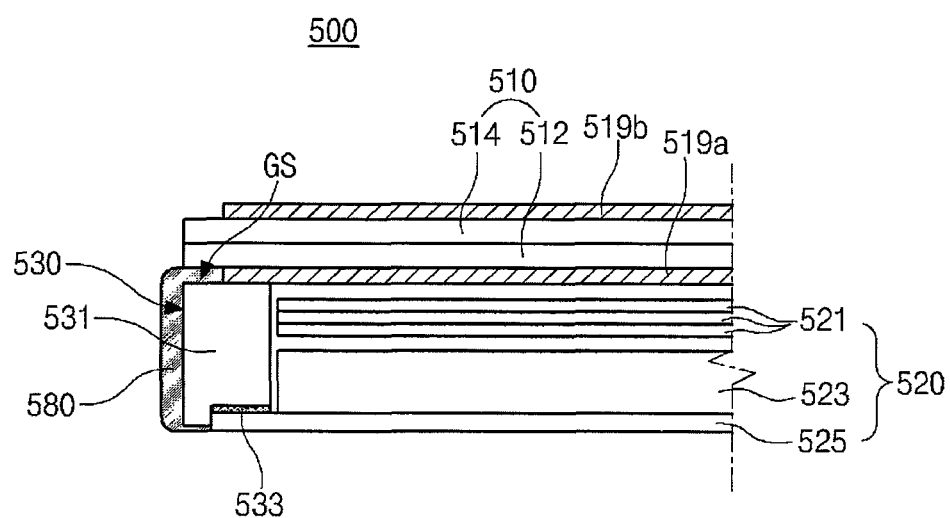
FIG. 6 is a cross-sectional view showing a liquid crystal display device according to a fifth embodiment of the present invention.

FIG. 6 is a cross-sectional view showing a liquid crystal display device according to a fifth embodiment of the present invention.

In FIG. 6, a liquid crystal display (LCD) device 500 includes a liquid crystal panel 510, a backlight unit 520 and a main frame 530. A light guide plate 523, a light emitting diode (LED) assembly (not shown) and a plurality of optical sheets 521 are sequentially disposed over a reflecting plate 525 to constitute the backlight unit 520. A main frame 530 including a vertical portion 531 is formed to surround the backlight unit 520. For example, the reflecting plate 525 of the backlight unit 520 may be attached to the main frame 530 by an attaching member 533 such as a double-sided tape.

In addition, the main frame 530 may be formed of a mixture of a synthetic resin material such as polycarbonate and a glass fiber to have a white color. Since the main frame 530 is formed of a white colored material, brightness of the LCD device 500 is improved by reflecting a light from the backlight unit 520.

The liquid crystal panel 510 including first and second substrates 512 and 514 and a liquid crystal layer (not shown) therebetween is disposed over the backlight unit 520. First and second polarizing plates 519a and 519b are formed on the outer surfaces of the first and second substrates 512 and 514, respectively. The backlight unit 520 supplies a planar light to the liquid crystal panel 510. Although not shown, a light shielding member such as a tape may be formed between the liquid crystal panel 510 and the main frame 530 to prevent a light leakage through a non-display area.

An adhesive 580 having a black color is formed on a side surface of the LCD device 500 through a coating method.

For example, the adhesive 580 may be formed on a top surface and a side surface of the vertical portion 531 of the main frame 530. Accordingly, a gap space GS between the liquid crystal panel 510 and the main frame 530 may be filled with the adhesive 580.

The adhesive 580 may have a liquid phase or a gel phase having a viscosity so that the adhesive 580 can be formed through a coating method. For example, the adhesive 580 may include one of polyester material such as cyanoacrylate resin, epoxy resin, polyolefine, polymethylmethacrylate (PMMA), polyacrylate, polyacrylic acid, polyurethane and polyethyleneterephthalate (PET), instant glue such as silicon resin, polymer glue resin such as thermal glue and solvent-based glue, derivatives thereof and blends including at least two thereof. In addition, the adhesive 580 may further include a black dye material or a black pigment material.

In addition, the adhesive 580 is hardened by irradiation of an ultraviolet (UV) light. For the curing step of irradiating a UV light, the adhesive 580 may include a monomer, a photoinitiator, a photocatalyst and a solvent. In another embodiment, the adhesive 580 may be hardened by one of a heat, a moisture and a time through a subsequent curing step. After the curing step, the edge portion of the liquid crystal panel 510 is attached and fixed to the main frame 530 by an adhesive 580.

In the LCD device 500 where a top frame and a bottom frame are omitted, since the adhesive 580 is formed to have a thickness smaller than about 0.3 mm, the adhesive 580 on the side surface of the LCD device 500 may have a fourth width d4 smaller than about 0.3 mm. In addition, since the adhesive 580 in a non-display area attaches and fixes the liquid crystal panel 510 to the main frame 530, an additional area for a fixing member such as a tape is not required. Accordingly, a narrow bezel where the width of the bezel area is smaller than about 1.0 mm is obtained.

Furthermore, since the adhesive 580 having a black color is formed on the side surface of the LCD device 500, a part of light is reflected by the main frame 530 and another part of light penetrating the main frame 530 is absorbed by the adhesive 580. Accordingly, a light leakage through a side surface of the LCD device 500 is prevented without reduction of brightness.

Moreover, since the adhesive 580 is formed on the top surface and the side surface of the backlight unit 520, a fixing force is improved so that the liquid crystal panel 510 can be stably attached and fixed to the main frame 530.

In addition, since the liquid crystal panel 510 is attached and fixed to the backlight unit 520 by the adhesive 580 through a coating method, a new mold is not required for the main frame 530 even when the specification of the LCD device 500 is changed. Accordingly, fabrication cost is reduced. Further, since the adhesive 580 is formed of a resin material, the external impact to the LCD device 500 may be mitigated by the adhesive 580.

Although the adhesive is exemplary applied to the LCD device in the first to fifth embodiments, the adhesive according to the present invention may be applied to the other FPD such as the PDP and the OLED. For example, a plasma panel or an organic light emitting diode panel may be attached and fixed to a main frame or a bottom frame by an adhesive. In addition, the adhesive may be formed on a side surface of the PDP or the OLED to prevent a light leakage through the side surface.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A display device, comprising:
    a display panel displaying an image;
    a first frame surrounding the display panel;
    a backlight unit under the display panel, the backlight unit including a reflecting plate, a light guide plate and a plurality of optical sheets and supplying a light to the display panel;
    a polarizing plate on a top surface of the display panel; and
    a single adhesive member between a side surface of the display panel and a side surface of the first frame,
    wherein the display panel is attached and fixed to the first frame by the single adhesive member,
    wherein the first frame has a rectangular ring shape and includes a vertical portion,
    wherein the single adhesive member only contacts the display panel, the first frame and the polarizing plate,
    wherein the reflecting plate is attached to the first frame by an attaching member,
    wherein the attaching member and a portion of the reflecting plate are both disposed under and overlapping with the single adhesive member and the side surface of the display panel,
    wherein the reflecting plate is attached to a step difference portion of the first frame by the attaching member,
    wherein a protrusion is disposed on a central portion of an inner surface of the vertical portion of the first frame,
    wherein the display panel is disposed on a top surface of the protrusion,
    wherein the light guide plate and the plurality of optical sheets are disposed on a side surface of the protrusion,
    wherein the reflecting plate is disposed on a bottom surface of the protrusion,
    wherein the top surface of the protrusion is lower than an uppermost surface of the first frame and the bottom surface of the protrusion is higher than a lowermost surface of the first frame,
    wherein an edge front outer surface of the display panel and a top surface of the vertical portion are flush with each other, and
    wherein the single adhesive member contacts the edge front outer surface of the display panel and the top surface of the vertical portion.

2. The display device according to claim 1, wherein a portion of the display panel is in contact with the single adhesive member and extends beyond an edge of the polarizing plate.

3. The display device according to claim 1, wherein the reflecting plate is attached to a bottom surface of the first frame by the attaching member.

4. The display device according to claim 1, wherein a portion of the first frame is disposed between the display panel and a portion of the reflecting plate overlapping with and extending beyond an outer edge of the display panel.

5. A display device, comprising:
    a display panel displaying an image;
    a backlight unit under the display panel, the backlight unit supplying a light to the display panel;
    a first frame surrounding the backlight unit; and
    an adhesive on a side surface of the display panel and a side surface of the first frame,
    wherein the display panel is disposed to cover and overlap the backlight unit and the first frame, wherein the display panel is attached and fixed to the first frame by the adhesive, wherein the adhesive has a black color and is formed on the whole outer side surface of the first frame, wherein the adhesive fully covers an outer edge of the first frame and an outer lateral edge of the adhesive forms an outer lateral surface of the display device, and wherein the adhesive surrounds an upper surface of the first frame and a lower surface of the first frame with respect to a viewing direction of the display device.

6. The display device according to claim 5, wherein the adhesive is formed on a top surface of the first frame and a gap space between the display panel and the first frame is filled with the adhesive.

7. The display device according to claim 5, further comprising a light shielding member between the display panel and the first frame.

8. The display device according to claim 5, wherein the adhesive is disposed on an outer whole of each of four side surfaces of the first frame.

9. The display device according to claim 5, wherein the backlight unit includes a reflecting plate attached to a bottom surface of a step difference portion of the first frame by an attaching member.

10. A display device, comprising:
a display panel displaying an image;
a first frame surrounding the display panel;
a backlight unit under the display panel, the backlight unit including a reflecting plate, a light guide plate and a plurality of optical sheets and supplying a light to the display panel;
a polarizing plate on a top surface of the display panel; and
a single adhesive member between a side surface of the display panel and a side surface of the first frame,
wherein the display panel is attached and fixed to the first frame by the single adhesive member,
wherein the first frame has a rectangular ring shape and includes a vertical portion,
wherein the single adhesive member is adjacent to and contacts the polarizing plate on the top surface of the display panel,
wherein the reflecting plate is attached to the first frame by an attaching member,
wherein the attaching member and a portion of the reflecting plate are both disposed under and overlapping with the single adhesive member and the side surface of the display panel,
wherein a portion of the edge front outer surface of the display panel is in contact with the single adhesive member and extends beyond an edge of the polarizing plate,
wherein a protrusion is disposed on a central portion of an inner surface of the vertical portion of the first frame,
wherein the display panel is disposed on a top surface of the protrusion,
wherein the light guide plate and the plurality of optical sheets are disposed on a side surface of the protrusion,
wherein the reflecting plate is disposed on a bottom surface of the protrusion,
wherein the top surface of the protrusion is lower than an uppermost surface of the first frame and the bottom surface of the protrusion is higher than a lowermost surface of the first frame,
wherein an edge front outer surface of the display panel and a top surface of the vertical portion are flush with each other, and
wherein the single adhesive member contacts the edge front outer surface of the display panel and the top surface of the vertical portion.

11. The display device according to claim 10, wherein the single adhesive member only contacts a side of the polarizing plate, the edge front outer surface of the display panel, a top surface of the vertical portion of the first frame and a side portion of the first frame.

12. The display device according to claim 10, wherein the reflecting plate is attached to a bottom surface of the first frame by the attaching member.

13. The display device according to claim 10, wherein the reflecting plate is attached to a bottom surface of a step difference portion of the first frame by the attaching member.

14. A display device, comprising:
a display panel displaying an image;
a first frame surrounding the display panel;
a backlight unit under the display panel, the backlight unit including a reflecting plate, a light guide plate and a plurality of optical sheets and supplying a light to the display panel;
a polarizing plate on a top surface of the display panel; and
a single adhesive member between a side surface of the display panel and a side surface of the first frame,
wherein the display panel is attached and fixed to the first frame by the single adhesive member,
wherein the first frame has a rectangular ring shape and includes a vertical portion,
wherein the single adhesive member only contacts the display panel, the first frame and the polarizing plate,
wherein the reflecting plate is attached to the first frame by an attaching member,
wherein the attaching member and a portion of the reflecting plate are both disposed under and overlapping with the single adhesive member and the side surface of the display panel,
wherein the reflecting plate is attached to a step difference portion of the first frame by the attaching member,
wherein a protrusion is disposed on a central portion of an inner surface of the vertical portion of the first frame,
wherein the display panel is disposed on a top surface of the protrusion,
wherein the light guide plate and the plurality of optical sheets are disposed on a side surface of the protrusion,
wherein the reflecting plate is disposed on a bottom surface of the protrusion,
wherein a width of the top surface of the protrusion is smaller than a width of the bottom surface of the protrusion,
wherein an edge front outer surface of the display panel and a top surface of the vertical portion are flush with each other, and
wherein the single adhesive member contacts the edge front outer surface of the display panel and the top surface of the vertical portion.

* * * * *